W. G. TEMPLETON.
COFFEE AND TEA MIXER.
APPLICATION FILED SEPT. 19, 1912.
1,102,305.
Patented July 7, 1914.
Fig. 1.
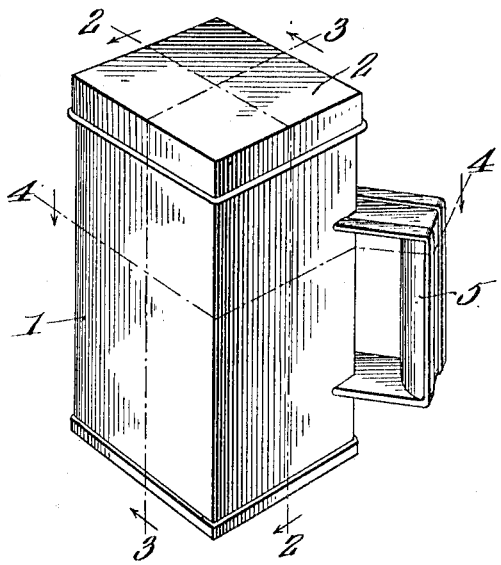
Fig. 2.
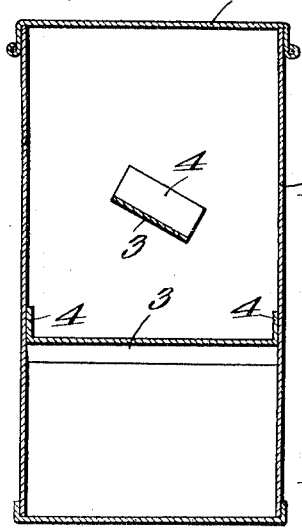
Fig. 3.
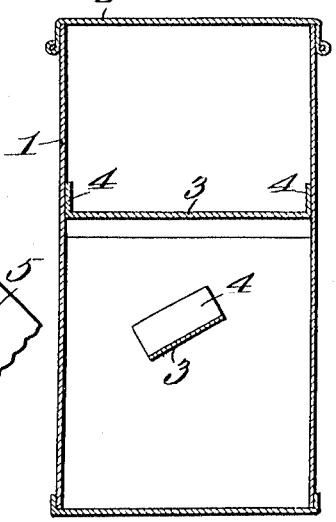
Fig. 5.
Fig. 4.
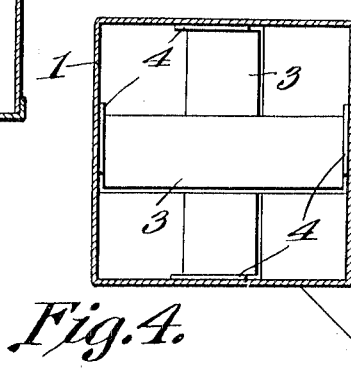
Witnesses:
W. G. Templeton, Inventor,
by C. A. Snow & Co.
Attorneys.

UNITED STATES PATENT OFFICE.

WILLIAM G. TEMPLETON, OF COLORADO SPRINGS, COLORADO.

COFFEE AND TEA MIXER.

1,102,305.   Specification of Letters Patent.   Patented July 7, 1914.

Application filed September 19, 1912. Serial No. 721,302.

*To all whom it may concern:*

Be it known that I, WILLIAM G. TEMPLETON, a citizen of the United States, residing at Colorado Springs, in the county of El Paso and State of Colorado, have invented a new and useful Coffee and Tea Mixer, of which the following is a specification.

This invention relates to coffee blenders.

One object of the invention is, in a simple, practical and thoroughly effective manner, to blend different brands of coffee by manual manipulation, and so to accomplish the result as to insure the perfect intermingling of the different classes of grains, thus to obtain a product that shall be of uniform character and like flavor throughout the mass.

A further object is to construct the article in such manner as to permit of its being manufactured and sold at a price that will place it within the purchasing means of any person requiring such a utensil.

With the above and other objects in view, as will appear as the nature of the invention is better understood, the same consists, generally stated, in a container, of any desired contour in cross section, and having arranged therein a plurality of baffles disposed at an angle to each other, preferably at right angles, and having their terminals rigidly secured to the walls of the container. By preference, the baffles are arranged on opposite angles relative to each other, thus to insure a cutting or separation of the contained coffee when the container is manipulated, so as to turn it end for end, or is rotated around a horizontal axis, the oblique disposition of the baffles operating, further, to insure the ready discharge of the contents of the utensil, when thorough blending is effected, as the grains will be caused to slide off from the baffles and thus be discharged with the bulk of the coffee.

The invention consists further in certain novel details of construction, hereinafter fully described and claimed.

In the accompanying drawing, forming part of this specification, and in which like characters of reference indicate corresponding parts,—Figure 1 is a view in perspective of the utensil; Fig. 2 is a vertical transverse sectional view taken on the line 2—2, Fig. 1; Fig. 3 is a view similar to Fig. 2 taken on the line 3—3, Fig. 1; Fig. 4 is a horizontal sectional view taken on the line 4—4, Fig. 1; Fig. 5 is a view similar to Fig. 4 of a slightly modified form of the invention.

Referring to the drawing, 1 designates the container for the coffee to be blended, the same being constructed preferably of tin and provided with a fixed bottom and a hinged cover 2, the flanges of which, by preference, embrace the outer walls of the container with sufficient frictional contact to insure the detention of the lid or cover in place during the manipulation of the blender. The container is herein shown as of rectangular contour in cross section, but it is to be understood that it may be of any other shape that may be found of advantage in use, and still be within the scope of the invention.

Arranged within the container and spaced at the proper distance apart, are a plurality of baffles 3, in this instance two being shown, which are disposed at right angles to each other, as exhibited in Fig. 4, and have their terminals 4 upturned, and secured to the inner walls of the container in any suitable manner, as by rivets or solder. As shown in Figs. 2 and 3, the baffles are obliquely disposed relative to the walls of the container and are oppositely inclined relative to each other, so that in the act of manipulating the utensil for the purpose of blending the coffee, the grains will be caused to slide off from the baffles and thus be thoroughly intermingled so that the resulting product will be of uniform character throughout.

Secured to the container, in this instance to one corner thereof, and preferably intermediate of its ends, is a handle 5 by which the container may be manipulated either to turn it end for end, or agitate it horizontally to secure proper intermixture of the different brands of coffee being blended, and also to facilitate the discharge of the contents when the blending has been effected.

In each embodiment of the invention thus far discussed, the baffles are described as extending from wall to wall of the container, and while this arrangement has been found to secure the desired results, it is also possible to carry out the procedure in other ways. Thus, as an example of modifying the arrangement of the baffles without in the least detracting from the effective operation of the utensil, the arrangement shown in Fig. 5 may be employed, in which the baffles 6 are shown as secured only at one end to the walls of the container, the other ends being spaced at any desired distance from the adjacent walls. In practice, the free ends of the baffles will preferably be sufficiently close to the container walls to prevent escape therebetween of the grains.

In use, the cover or lid of the utensil is opened and the different grades of coffee are poured into the container, after which the lid is closed. The handle is now grasped and the container is turned end for end any desired number of times, and as the grains fall upon the baffles they are caused to be agitated and thus thoroughly co-mingled, so that when the product is discharged from the container, it will be evenly mixed, and thus will insure like flavor to the coffee when the same is prepared for drinking purposes. In addition to the end for end movement of the container, a longitudinal shaking movement may be employed which will serve still further to effect the desired blending.

As will be obvious, the utensil will be equally as well adapted for blending teas as coffees.

While two baffles have been illustrated, it has been found in practice that one will give thoroughly satisfactory results, and as this obvious modification will readily be understood, detailed illustration thereof is deemed unnecessary.

The structure herein defined, while simple in character, will be found thoroughly efficient for the purposes designed, and will provide a household article that will be found of the highest utility and thoroughness in use.

What is claimed is:

A coffee blender adapted to be carried in the hand and reciprocated, the same comprising a rectangular container and a plurality of baffles extending straight across the center of the container from the walls thereof, said baffles being crossed and extending from wall to wall, each baffle being obliquely disposed relative to the walls, each baffle being uniformly pitched from end to end.

In testimony that I claim the foregoing as my own, I have hereto affixed my signature in the presence of two witnesses.

WILLIAM G. TEMPLETON.

Witnesses:
SELINA WILLSON,
R. M. ELLIOTT.

---

Copies of this patent may be obtained for five cents each, by addressing the "Commissioner of Patents. Washington, D. C."